July 16, 1963   C. J. CARLSON, JR., ET AL   3,097,360
FASTENER ASSEMBLAGE
Filed June 26, 1961
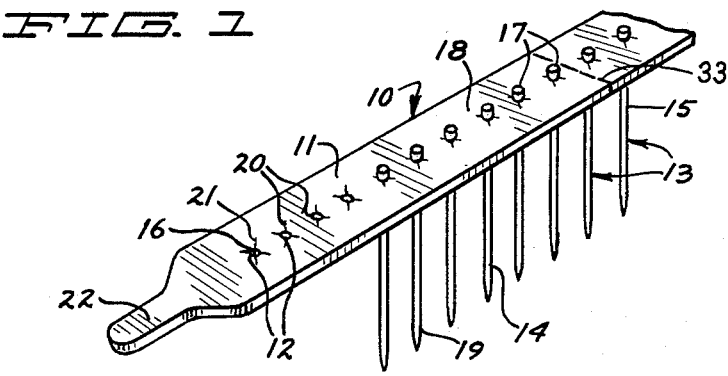
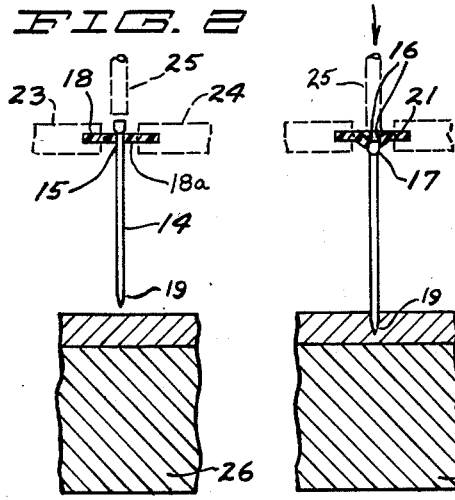
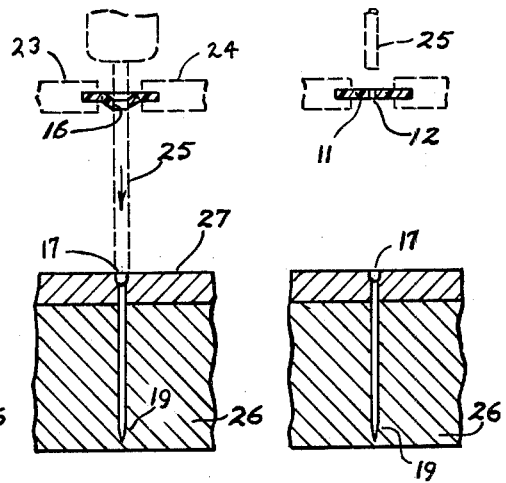
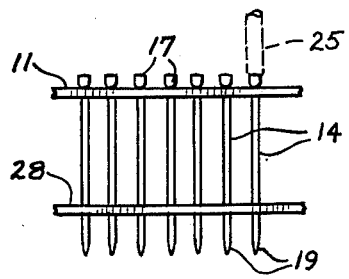
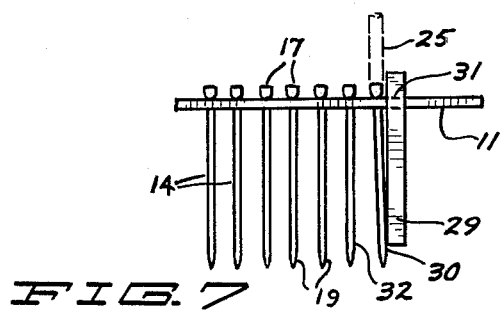
INVENTORS
DONALD W. CARLSON
BY CARL JOSEPH CARLSON JR.
Frederick C. Meyers
ATTORNEY 3,097,360
FASTENER ASSEMBLAGE
Carl J. Carlson, Jr., Omaha, Nebr. (15682 S. Woodgate Road, Hopkins, Minn.), and Donald W. Carlson, 516 Meadow Road, Omaha, Nebr.
Filed June 26, 1961, Ser. No. 119,478
4 Claims. (Cl. 1—56)

This invention relates to automatic driving of fasteners and more particularly to a preloaded fastener strip for consecutively feeding a series of peg-type fasteners such as nails into a driving position.

In the past, power operated automatic driving equipment has been used extensively, by way of example, in the building industry, in furniture manufacture, and in crating for shipment, where wooden members have been nailed together in mass quantity. These guns are usually driven by compressed gases or electrical means and occasionally the fasteners are driven home by an explosive means. The invention herein involved is concerned with an improved type of strip assemblage for carrying and feeding the fasteners preparatory to the driving operation. The invention is not limited to any one of the particular devices mentioned above but may be used in any power operated driving machine which utilizes a pin driver for driving the fastener into the work piece.

A very common means for feeding nails into a nailing machine has been the welding of the nails to a metal strip so that proper orientation is at all times maintained. A drawback to this means, however, is that part of the strip itself is driven free of the remainder of the strip and then carried along with the nail, ultimately to form a permanent part of the nail since it is never removed. By this means, there is a natural resulting scrap material which, when fed out of the nailing machine, has sharp edges which may, and often do, cause injury to the operator.

Another problem commensurate with the metal nail holding strips is that considerably extra force is required to break the nail from its carrying strip depending on the amount of connecting metal therebetween.

It is within the contemplation of the present invention that a flexible and resilient holding strip of material be utilized to carry any peg-type fastener of the type adapted to be driven. The invention has been found to work equally well with large or small nails, screws, dowels, rivets, etc., the principle of operation being that the shank of the fastener be frictionally held by the holding strip and the head of the fastener driven completely through the strip during the driving operation. Thus dangerous by-products of the nailing operation are avoided. In addition, there is little added force required by the driving machine to free the fastener of the holding strip.

It is an object of this invention to provide a ribbon of material which has a plurality of apertures that frictionally hold peg-type fasteners in alignment for feeding into the conventional-type automatic driving machines.

Another object of this invention is to provide a ribbon of material as described above which distorts at the aperture to hold a fastener and which resiliently yields when the head of the fastener is forced through the ribbon during the driving operation. A further object is to provide an economical and efficient strip means for feeding peg-type fasteners through a driving machine which does not produce sharp and dangerous protuberances, and which may be easily coiled or bundled for disposal after use.

A still further object is to provide a holding ribbon of material of such character as to hold and retain peg-type fasteners, preparatory to automatic driving, and yet is not substantially destroyed during the driving operation.

A further object of this invention is to provide a simple and efficient method of feeding peg-type fasteners into the conventional-type automatic driving machines in a highly reliable manner for failure-free operation.

A still further object is to provide a precise method of positioning and driving the fasteners of the type described above.

These and other objects and advantages of this invention will more fully appear from the following description, made in connection with the accompanying drawing, wherein like reference characters refer to the same or similar parts throughout the several views and in which:

FIGURE 1 is a perspective view of a nailing strip contemplated by this invention;

FIGURE 2 shows in partial cross-section the nailing strip in relation to a work piece as it is held prior to the driving operation;

FIGURE 3 shows the fastener being driven into the work material and free of the holding ribbon;

FIGURE 4 shows the nail at the instant it has been driven home, the pin driver extending through and deforming the holding ribbon;

FIGURE 5 shows the holding strip after the driving operation has been completed;

FIGURE 6 shows one form of a means for precisely positioning the fastener assemblage; and FIGURE 7 shows an alternate form of positioning means for the fasteners.

Referring more specifically now to FIGURE 1, the invention is shown as a fastener or nailing strip 10 which consists of an elongate holding ribbon 11, having a plurality of apertures 12, and elongate peg-type fasteners 13. The ribbon 11 consists of a flexible and resilient material such as polyethylene which will easily yield under pressure during the driving operation of the fasteners yet stiff enough to retain its ribbon shape. The purpose and importance of this type of material will become apparent subsequently when the driving operation is explained.

As shown in FIGURE 1, the elongate peg-type fasteners are of the type adapted to be driven and, in this instance, are represented as nails. It is understood that screws of any size, as well as rivets, may be likewise positioned in the ribbon, the size of the fastener simply dictating the corresponding size of apertures 12.

The fasteners 13 have a shank portion 14 frictionally held at the upper end 15 by the aperture side walls 16. The heads 17 are all positioned against the upper surface 18 of ribbon 11 thereby identically orienting all of the fasteners the same for feeding into an automatic driving machine. In this form of the fastener, there is a sharpened or driving end 19 which allows greater ease of driving into a work piece. With the fasteners 13 positioned as such, the shank portions 14 will extend from the underside 18a (see FIGURE 2) of the ribbon 11 in an upstanding relation.

So that the variously sized fasteners may be accommodated by the ribbon with the proper holding friction upon the shank portion, it is sometimes necessary to increase the available size of aperture 12. Likewise, the size of fastener head may be considerably larger than the shank, in which instance a larger effective aperture would be required so that the head thereof could be forced through the ribbon. To accommodate these variations in size, the apertures 12 may be enlarged by providing a plurality of outwardly extending slits or cross-cuts 20. Depending upon the size of head, the ends 21 of slits 20 may extend outwardly at any desired distance. In the form of aperture means shown in FIGURE 1, the aperture 12 is of such size as to frictionally hold the fastener shank 14. The slits 20 are of sufficient length to allow the heads 17 to be easily forced through the ribbon 11 during the driving operation.

Also forming a part of the ribbon 11 is a pull tab 22 which may be advantageously utilized during the loading operation of the nailing strip into the automatic driving machine. For example, the nailing strip would be slid through a pair of guide channels 23 and 24 (see FIGURE 2) until the pull tab extended beyond an exit opening of the driving machine. Then the pull tab is grasped by the operator and the entire fastening strip then pulled until the first nail is adjusted to the position ready for driving.

Referring to FIGURES 2, 3, 4, and 5, the nailing operation will be explained. In each of the four figures the guide channels 23 and 24 are represented in phantom drawing as well as the pin driver 25. The pin driver is the usual and conventional mechanism for driving fasteners into a work piece such as work piece 26.

FIGURE 2 shows a nail fastener in orientation with respect to the work piece 26 preparatory to being driven by pin driver 25. It is seen, in this view, that the head 17 is resting in juxtaposition against the upper surface 18 of ribbon 11 and the aperture side walls 16 are in frictional contact with the upper portion 15 of shank 14.

In FIGURE 3, the actual driving of the nail has commenced wherein the driving end 19 has begun its impregnation of the work piece 26. This view shows the deformation of the aperture means as the head 17 is being driven therethrough. As may be seen, the aperture side walls 16 tend to yield with the movement of the head. The yielding portion of the aperture terminates substantially at the cross-cut ends 21 thereby limiting the amount of yield at the side walls 16.

FIGURE 4 discloses the fastener after it has been driven home by the driving thrust of the pin driver 25. The pin driver, of course, is adjusted so that its extreme driving limit coincides with the upper surface 27 of the work piece, as is readily understood by those skilled in the art. The fastener has been driven free of the holding ribbon 11 and the pin driver 25 is the element which now causes the aperture means to retain the expanded or yielded position.

Once the pin driver 25 is withdrawn to its normal position, as shown in FIGURE 5, the aperture 12 contracts to normal size. The normal size is slightly smaller than that shown in FIGURE 2 since the frictional pressure of the side wall 16 upon the shank 14 is now eliminated.

It will be noticed from the above that during the entire driving operation, the holding ribbon 11 was maintained at substantially the same height above the upper surface 27 of work piece 26. Also, the entire ribbon is fully intact since it had no portions thereof removed along with the fastener during the driving operation.

Although the nails are positioned in a substantially spaced and parallel relation (see FIGURE 1), it is desirable to precisely position them, preparatory to the driving operation, in a parallel relation to the pin driver 25, thus, preventing the fastener from going askew during the driving operation. To accomplish this positioning, a positioning means is incorporated such as guide strip 28 as shown in FIGURE 6. The guide strip is a second holding means which is substantially the same as the holding ribbon 11, i.e., having apertures and slit means which allow frictional holding of the fastener shanks and yieldable means for driving of the fastener head 17 therethrough during the driving operation. As with the ribbon 11, the positioning means is maintained above the working piece the same distance at all times.

An alternate positioning means such as a magnet 29 may also be employed (see FIGURE 7). In this form of the positioning means, the magnet is located adjacent the fastener 30 which is oriented, for driving, below the pin driver 25. As the fastener approaches the magnet upon advancement of the ribbon 11, the magnet 29 attracts and positions the fastener shank in the proper orientation for driving. An opening 31 in magnet 29 allows the expended ribbon to be expelled and a second fastener 32 to be positioned ready for driving as was fastener 30.

Through the above, it is readily recognized that a very economical means of feeding fasteners into an automatic driving machine has been devised which, because of its substantially jam-proof configuration, maintains a high reliability in operation. It is also seen that the fastener has been driven into the work piece without the adhesion of extraneous components which have been forcefully dislodged from the holding ribbon itself. If economy demands the reuse of the ribbon, it is seen that such reuse would be possible because of the lack of damage to the apertures. However, if the ribbon is not to be used again and is expended, a means such as perforation 33 (as disclosed in FIGURE 1) may be incorporated. The ribbon may be perforated at predetermined intervals along the ribbon length, thereby allow breaking or tearing of expended portions of the holding ribbon 11 as the fasteners are used.

It will, of course, be understood that various changes may be made in the form, details, arrangements and proportions of the parts without departing from the scope of our invention as set forth in the appended claims.

What is claimed is:

1. A fastener strip comprising, a strip of flexible and resilient material having a relatively greater width than depth, a plurality of apertures formed in longitudinally spaced relation intermediate the side edges of said strip and through the depth thereof, each of said apertures defining discontinuous side walls comprising inwardly extending radial abutment members each separated from the other by a cut extending outwardly from the aperture, said apertures being adapted to receive a plurality of fasteners, one each in said apertures, said fasteners each being provided with a head and a depending shank adapted to lie in frictional engagement with the aperture side walls, said strip retaining said fastener substantially normal to said strip but permitting a driving instrumentality to engage said head and to project together therewith through said aperture, said discontinuous side walls frictionally yielding to permit the projection of the driving instrumentality through the strip.

2. The fastener strip of claim 1 wherein the aperture side walls form a substantially complete peripheral edge abutment about said shank.

3. The fastener strip of claim 1 wherein the strip is constructed of polyethylene.

4. A fastener strip for use in an automatic driving machine comprising, an elongated holding ribbon of flexible and resilient material having a plurality of openings spaced longitudinally therealong adapted to receive a fastener in each of said plurality of openings in an upstanding relation to said ribbon, said fastener having a head end and an elongate shank, and at least one guide strip substantially similar to said ribbon and frictionally held to said shank in a position intermediate its ends for positioning each fastener at substantially right angles to said ribbon preparatory to the fastener being driven, whereby said strip with fasteners positioned therein may be continuously fed through a driving machine and the fasteners consecutively driven free of said ribbon and into a working material.

References Cited in the file of this patent

UNITED STATES PATENTS

| | | |
|---|---|---|
| 569,886 | Raymond | Oct. 20, 1896 |
| 689,667 | Blakeslee | Dec. 24, 1901 |
| 1,880,197 | Flood | Oct. 4, 1932 |
| 2,771,610 | Smith | Nov. 27, 1956 |
| 2,923,937 | Laucher | Feb. 9, 1960 |
| 2,938,213 | Gorn | May 31, 1960 |